United States Patent [19]

Kamenov

[11] Patent Number: 4,976,451
[45] Date of Patent: Dec. 11, 1990

[54] HUMAN POWERED VEHICLE

[76] Inventor: Kamen G. Kamenov, 244 4th Ave., San Francisco, Calif. 94118

[21] Appl. No.: 235,470

[22] Filed: Aug. 24, 1988

[51] Int. Cl.⁵ .............................................. B62M 1/12
[52] U.S. Cl. ................................. 280/226.1; 280/233; 280/288.1
[58] Field of Search ............... 280/231, 233, 230, 221, 280/223, 288.1, 226.1, 232, 234; 474/134, 137

[56] References Cited

U.S. PATENT DOCUMENTS

| | | | |
|---|---|---|---|
| 3,760,905 | 9/1973 | Dower | 280/233 |
| 4,411,443 | 10/1983 | Pollard | 280/288.1 |
| 4,508,358 | 4/1985 | Erel | 280/233 |
| 4,639,007 | 1/1987 | Lawrence | 280/233 |
| 4,647,060 | 3/1987 | Tomkinson | 280/288.1 |
| 4,796,907 | 1/1989 | Geller | 280/288.1 |

FOREIGN PATENT DOCUMENTS

| | | | |
|---|---|---|---|
| 3516322 | 10/1986 | Fed. Rep. of Germany | 280/226.1 |
| 1115959 | 9/1984 | U.S.S.R. | 280/226.1 |

*Primary Examiner*—Charles A. Marmor
*Assistant Examiner*—Victor E. Johnson

[57] ABSTRACT

A human-powered vehicle related to bicycles and rowing machines consisting of three or more wheels attached to a horizontal frame. For the purpose of a better understanding we will use a three-wheeled vehicle. There is no substantial difference between the front part of this invention and the front part of a regular bicycle. The rear wheels are attached to the frame and are driven by chains attached to their one-way sprocket freewheels. The chains are directly attached to a bar on which the pedals are mounted. There is a sliding board located on the front part of the framework which moves freely forwards and backwards on the frame. The board is covered with a soft foam-type material. The operator of this vehicle lies horizontally on the vehicle facing the ground and places the sliding board under his stomach while holding the handlebars and inserting his feet into the pedals. When the operator pushes on the handlebars his body slides backwards with the sliding board. At the same time, he pushes on the pedals with his feet. Notice that the operator does not turn the pedals. Both pedals move simultaneously backwards while pulling the chains with them, thus turning the rear wheels in the direction that moves the vehicle forward. Then, the operator pulls back with his arms and legs and returns to the starting position. When the operator pulls back, the pedals either move the chains freely in the other direction, due to one-way sprocket freewheels to which the chains are attached, or they continue moving the chains in the same direction as the wheels, due to a mechanism which locks the pedals bar to the upper part of the chains instead of the lower part as before, and thus turning them in the same direction. With few or no changes, this invention is convertible into a rowing machine. By sitting upright on the sliding board and by inserting his feet into front pedals the operator can steer the vehicle. By pushing and pulling on the front pedals and the rear handlebars with his hands and feet, he can create a forward motion of the vehicle. A second operator can be seated on an additional sliding board located at the rear of the framework. By pushing on the rear handlebars he can aid the first operator, who would be positioned horizontally, in the propulsion of the vehicle.

1 Claim, 3 Drawing Sheets

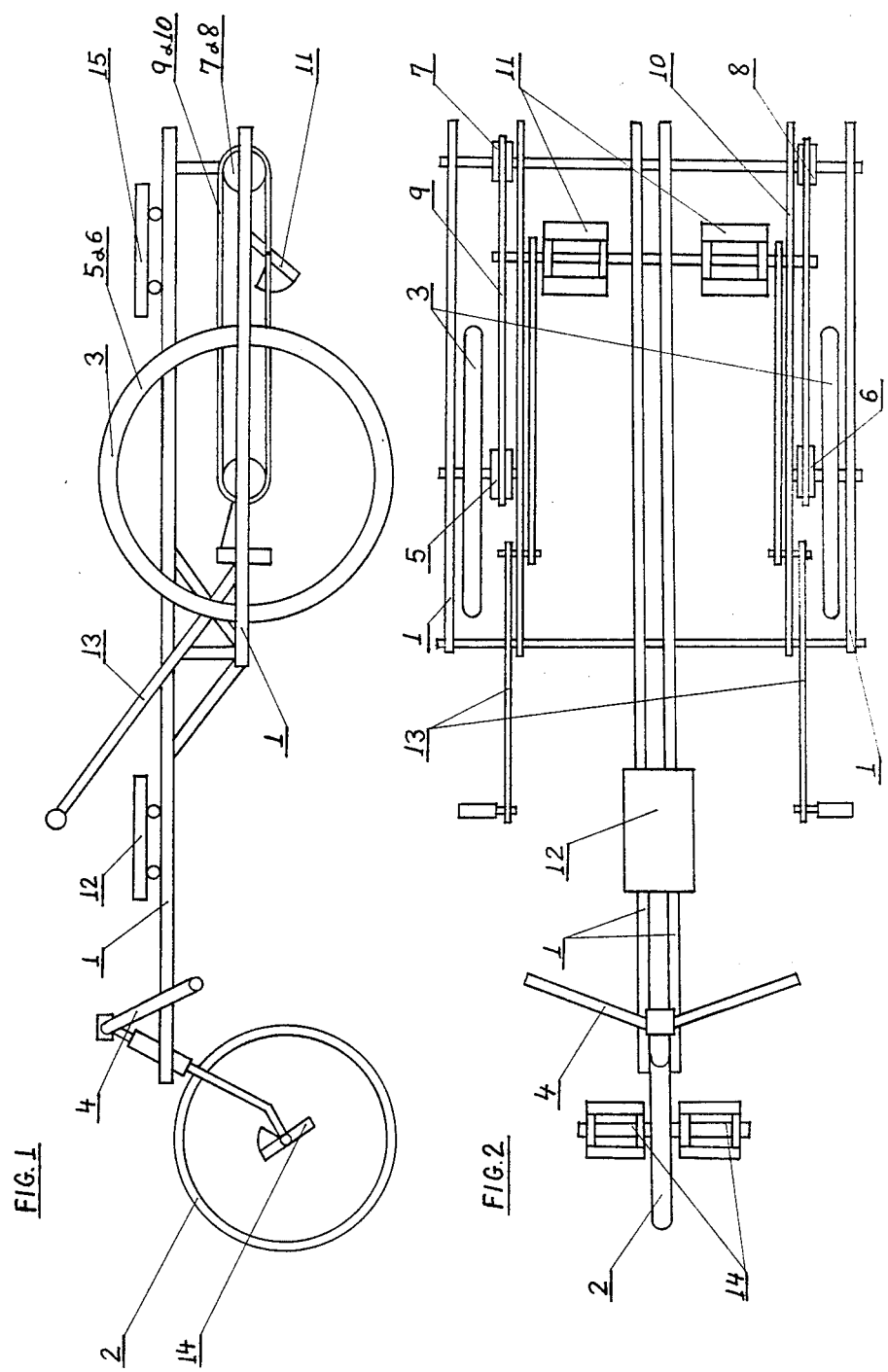

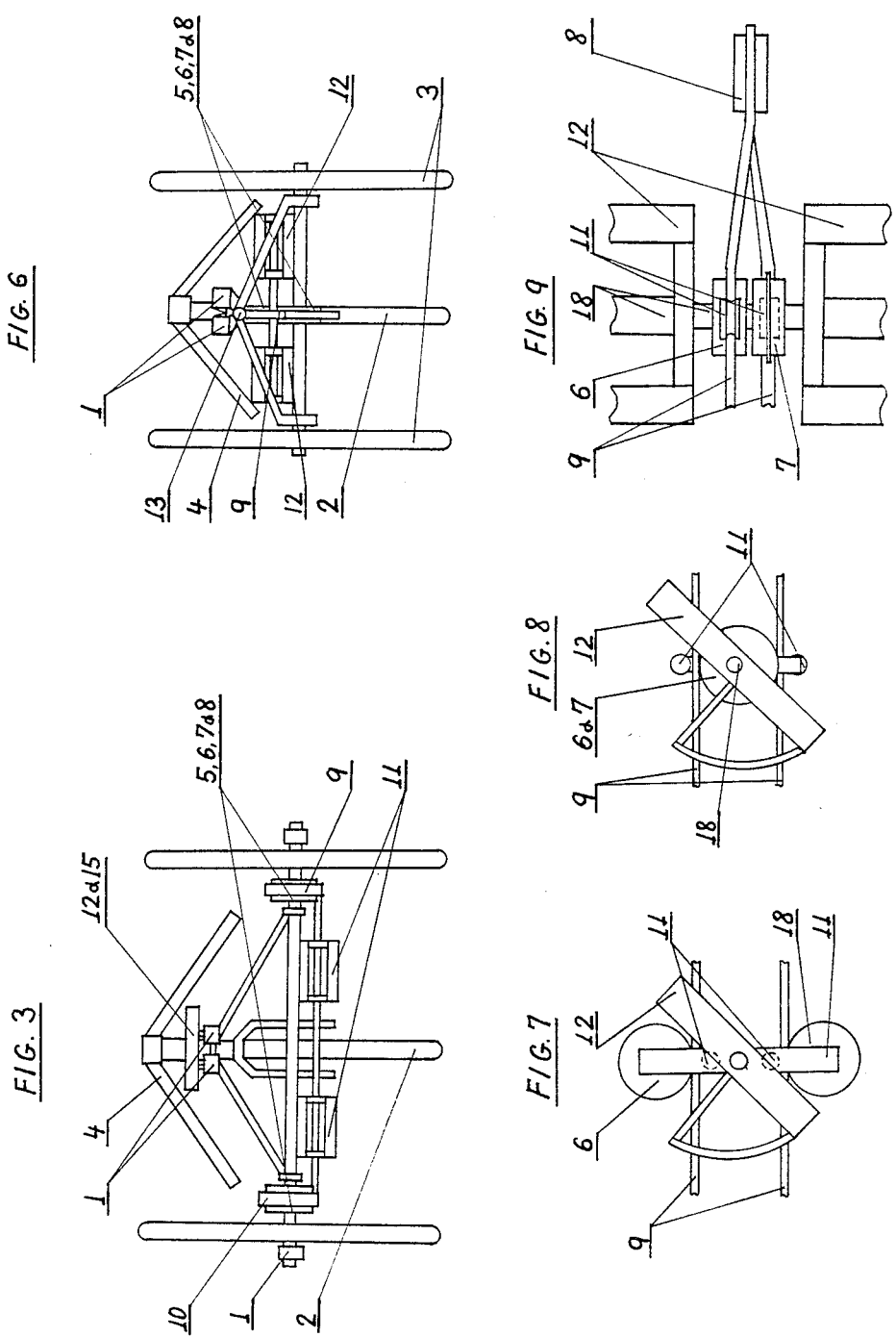

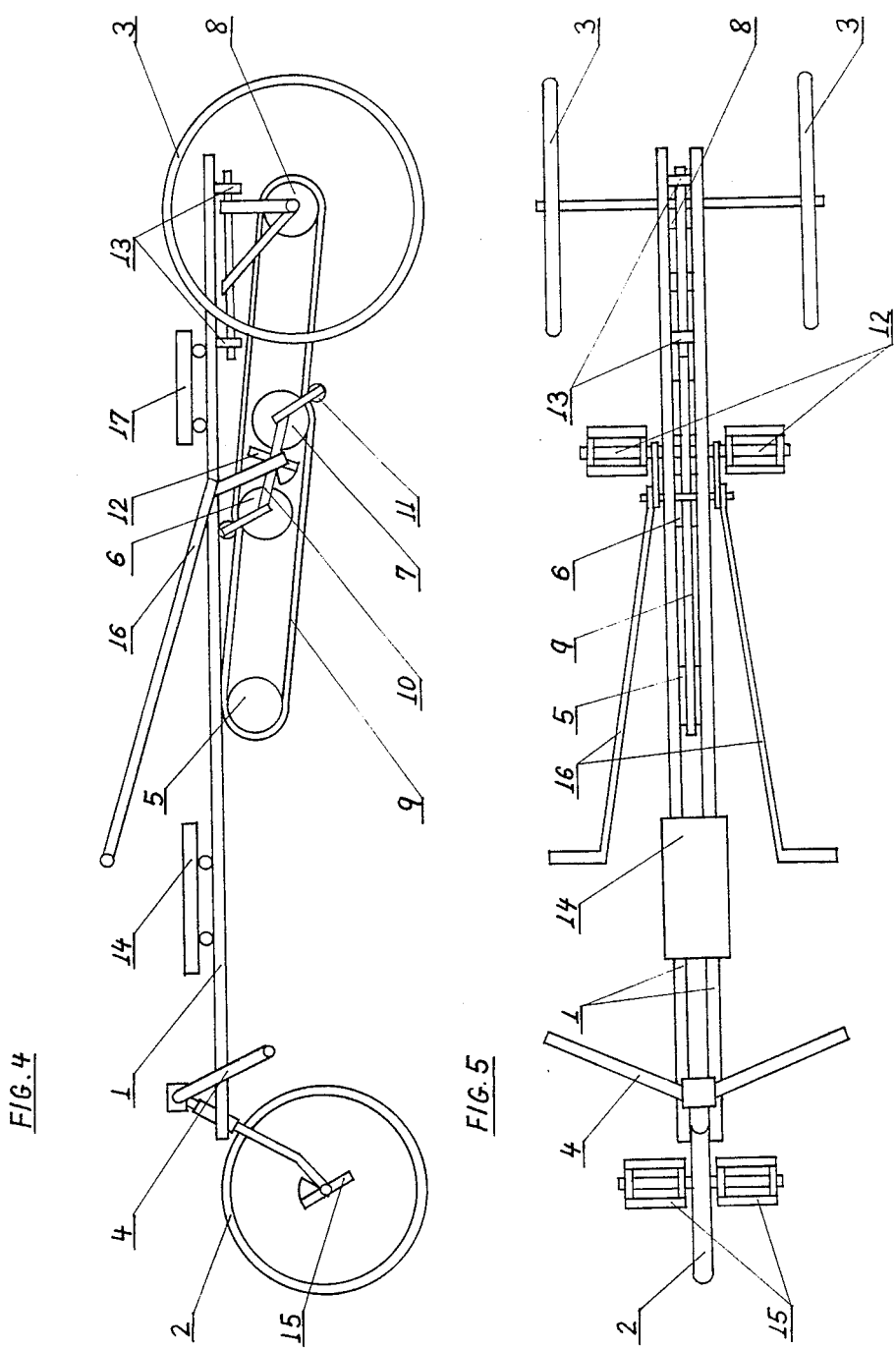

HUMAN POWERED VEHICLE

FIELD OF THE INVENTION

The present invention relates to recreational and exercise human-powered vehicles and is directed to harmonic and balanced development of the human body muscle structure.

BACKGROUND OF THE INVENTION

This invention relates to human powered exercise or transportation devices such as bicycles or rowing machines. With bicycles, however, only the legs can be exercised. In other types of rowing machines, the arms are employed but the position of the operator is usually seated or reclining, contrary to the position of the operator of this invention, who is lying horizontally on the vehicle facing the ground, while looking straight ahead like a swimmer, which position, besides lessening the resistance of the air, helps straighten the body posture. The operator efficiently uses almost all of the major muscles of his body, including the muscles of his back and stomach. The operator uses the vehicle out-of-doors, thus benefiting from the fresh air. The exercise vehicles of this nature that are known in the art are either too complicated or too bulky or both. In addition they use totally different positioning of the body and they do not benefit from the air resistance advantages of the streamlined, horizontally positioned body. The invention indicated here overcomes all of the prior art inventions by the simplicity and the difference of its mechanical construction.

SUMMARY OF THE INVENTION

In accordance with this invention the operator uses his whole body to create a motion. The movements of his body simulate the ones of a swimmer or a weight lifter in a horizontal position. The operator is lying horizontally or almost horizontally on the sliding bicycle seat and pushing the pedals with his legs, simultaneously sliding his body on the frame of the bicycle by pushing with his hands on the handlebars. Because of the simultaneous motion of the whole body, the operator is able to release more energy instantly like a weight lifter lifting heavy weights. Besides this, the horizontal positioning of his body on the bicycle saves a large amount of energy otherwise wasted on overcoming the resistance of the air. If a classic bicycle is moving with a speed of 10 mph approximately ⅓ of the energy is wasted on overcoming the resistance of the air. If the speed is 20 mph, the waste is close to 50% and if the speed is 30 mph the waste is almost 90%. If the operator wants to change his horizontal position he can do so by converting the bicycle into a rowing machine with few or no changes. Then he would be seated comfortably in a reclining position and rowing on the road. It is not necessary that the bicycle be built as a convertible bicycle/rowing machine. It can be either a whole-body bicycle or a rowing machine and it can have three or more wheels.

BRIEF DESCRIPTION OF THE DRAWINGS

For better understanding of the invention reference should be made to the drawings in which:

FIGS. 1, 2 and 3 show the side, top and rear views of the vehicle.

FIGS. 4, 5 and 6 show the side, top & rear views of a different construction of the vehicle and in the FIGS. 7, 8 and 9 a different construction of a mechanism that would drive the chain continuously in one direction, regardless of the direction the pedals are being pushed or pulled.

DETAILED DESCRIPTION OF THE INVENTION

The bicycle as shown in FIGS. 1-3 consists of a frame 1, a front wheel 2 and two rear wheels 3. There are steering handlebars 4 attached to the front whee. There are four sprocket freewheels 5, 6, 7 & 8, two on each side of the frame. The freewheels 5 & 6 are directly attached to the rear wheels of the bicycle. There are two chains 9 & 10 on each side of the frame directly attached to the freewheels 5 & 7 on the right and 6 & 8 on the left. There are two pedals 11 attached to a common axle, each side of which is attached to the chains 9 & 10. There is a sliding board 12 on the front side of the frame. The operator of this bicycle is supposed to lay his stomach on the board. The operator is supposed to hold the handlebars 4 with his hands and insert his feet into the pedals 11. Then the operator pulls himself with his arms toward the front of the bicycle. His body slides on the sliding board 12. At the same time, the operator pulls the pedals 11 toward the front of the bicycle. The pedals move freely forward and move the chains 9 & 10 with them, since they are attached to the lower part of the chains and the chains turn the freewheels freely in this direction. No motion to the rear wheels is transferred at this point. Then the operator pushes backwards with his arms and his legs. His body slides on the sliding board toward the rear of the bicycle and his legs straightened by pushing on the pedals 11. The pedals 11 pull the chains 9 & 10 in the other direction, and the chains turn the sprocket freewheels 5 & 6. Since the freewheels turn freely only in one direction they then block themselves from turning freely in the opposite direction and thus turn the rear wheels of the bicycle with them. The rear wheels 3 turn in the direction indicated by the arrows and move the whole construction forward on the road. The operator then repeats the same motion. He pulls himself forward and then pushes again on the handlebars and pedals, creating another motion in the rear wheels. If the operator wants to change his position on the bicycle from horizontal to reclining, he can do so by attaching additional pedals 14 to the front wheel 2 or handlebars 4 and additional handlebars 13 to the chains 9 and 10. Then he can sit on the sliding board 12 and insert his feet into the front pedals. The operator will use the front pedals to steer the bicycle and to push and pull himself forward and backward. When the operator sits on the seat 12 and pushes himself towards the rear of the bicycle, he is holding the handlebars 13 and pushing them towards the rear of the bicycle. The handlebars 13 slide on the frame 1 and are attached to the chains 9 & 10 just like the rear pedals 11. When the operator pushes backwards, the handlebars push the lower part of the chains 9 & 10 backwards and the chains turn the freewheels 5 & 6, which are attached to the rear wheels 3 of the bicycle and which turn them in the same direction indicated by the arrows. The wheels 3 touching the ground create the motion of the whole vehicle. Then the operator pulls himself forwards freely on the sliding board 12 and repeats the same motion again. If there is a second operator another sliding seat 15 can be attached to the rear part of the frame 1. The second operator will be creating the same motions described above, sliding on the rear seat 15 and pulling and pushing the handlebars 13 except for the steering of the vehicle. The first operator will be lying on the sliding board 12 and repeating the same motions described earlier for a horizontally positioned rider, as well as steering the vehicle.

FIGS. 4-9 show a bicycle consisting of a frame 1, front wheel 2, two rear wheels 3, handlebars 4, four sprocket freewheels 5, 6, 7 & 8, chain 9, a freewheel pedal holder 10, two sprocket chain wheels 11, pedals 12, an axle with two bearings 13, and a sliding board 14. The operator of this bicycle is supposed to lay on his stomach on the sliding seat 14, hold the handlebars 4 with his hands and insert his feet into the pedals 12. Then he stretches his arms and pushes on the handlebars 4 which makes his body slide on the sliding board 14. Simultaneously he pushes with his legs on the pedals 12 which are connected to the chain 9. Thus the lower part of chain 9 moves toward the rear of the bicycle in the direction indicated by the arrow. The chain itself turns around the sprocket freewheel 5 & 8. Freewheel 8 is connected to the rear wheels 3 through an axle and every time the freewheel 8 turns, the axle turns the wheels 3 as well. The turning motion of the wheels 3 creates the forward motion of the whole bicycle on the ground. When the operator pulls back with his hands on the handlebars 4 his body slides forward toward the front of the bicycle. Simultaneously, he pulls the pedals 12 with his legs. The pedals 12 are attached to the upper part of the chain 9 through the sprocket freewheel 6. This freewheel turns freely only in the direction indicated by the arrow next to it. It blocks itself in the other direction, which now is the case. When it blocks and moves forward it has to pull the chain 9 with it. Then the upper part of the chain 9 moves forward together with the freewheel 6 and turns the freewheel 8 with it, which in turn transfers its motion to the rear wheel 3. The freewheel 7 now moves together with the pedals 12 and the freewheel 6, too, toward the front of the bicycle but since the freewheel 7 turns freely in the direction indicated by the arrow next to it, it just rolls on the lower part of the chain 9 which moves freely toward the rear of the bicycle. The same thing happens with the upper part of the chain 9 when the operator pushes again on the pedals 12. In this case the freewheel 7 blocks itself from turning freely and pulls the chain 9 with it toward the rear of the bicycle. The freewheel 6 releases now and rolls in the chain 9 freely moving toward the rear together with the pedals 12 and the other freewheel 7, while the upper part of the chain 9 moves freely forward. This mechanism enables the chain 9 to turn in only one direction no matter in which direction the pedals move. The freewheels 6 & 7 could be located inside the chain 9 FIG. 4, outside the chain 9 (FIG. 7) or inside the chain 9 next to each other on a common axle (FIG. 8 and FIG. 9). The two small sprocket wheels 11 are attached to each freewheel 6 & 7. They can turn freely in each direction and their purpose is to hold the chain permanently close to the freewheels 6 & 7.

There are other options for riding this bicycle like the ones described above. Front pedals 15 could be attached to the front wheel 2 or the handlebars 4 and two other handlebars 16 could be attached to the rear pedals 12. Then, sitting on the sliding board 14, the operator could be rowing the bicycle, steering the front wheel with his legs, and at the same time pushing and pulling with his legs on the front pedals and his hands on the handlebars 16. If another seat 17 is attached to the rear of the frame 1 than a second rider could be seated there, helping to operate the vehicle in the same way as described earlier.

What is claimed is:

1. A human-powered vehicle comprising a frame, a front steerable wheel mounted to a forward portion of said frame, at least one drivable rear wheel mounted to a rearward portion of said frame,
    an operator board attached to an upper portion of said frame,
    a first one-way freewheel operatively attached to said rear wheel,
    a first two-way freewheel attached to said frame,
    a continuous chain connecting and encircling said first one-way freewheel and said first two-way freewheel, forming a upper and a lower portion,
    a pedal assembly comprising pedals and a bar holding said pedals,
    a second one-way freewheel connecting said bar to said upper chain portion,
    a third one-way freewheel connecting said bar to said lower chain portion,
    wherein a forward motion of said pedal assembly propels the upper portion of the chain forward through said second one-way freewheel thereby driving the rear wheel
    and a rearward motion of said pedal assembly propels the lower portion of said chain rearward through said third one-way freewheel thereby driving the rear wheel.

* * * * *